United States Patent
Nagata

(10) Patent No.: US 12,308,447 B2
(45) Date of Patent: May 20, 2025

(54) ELECTRICALLY CONDUCTIVE BASE AND SECONDARY BATTERY

(71) Applicant: MURATA MANUFACTURING CO., LTD., Kyoto (JP)

(72) Inventor: Yoshihide Nagata, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 512 days.

(21) Appl. No.: 17/895,316

(22) Filed: Aug. 25, 2022

(65) Prior Publication Data

US 2022/0407155 A1  Dec. 22, 2022

Related U.S. Application Data

(63) Continuation of application No. PCT/JP2021/004735, filed on Feb. 9, 2021.

(30) Foreign Application Priority Data

Feb. 26, 2020 (JP) .................................. 2020-030309

(51) Int. Cl.
  *H01M 50/50* (2021.01)
  *H01M 50/121* (2021.01)
  *H01M 50/126* (2021.01)
  *H01M 50/198* (2021.01)
  *H01M 50/531* (2021.01)
  *H01M 50/534* (2021.01)

(52) U.S. Cl.
  CPC ....... *H01M 50/121* (2021.01); *H01M 50/126* (2021.01); *H01M 50/198* (2021.01); *H01M 50/50* (2021.01); *H01M 50/531* (2021.01); *H01M 50/534* (2021.01)

(58) Field of Classification Search
  CPC .. H01M 50/50; H01M 50/531; H01M 50/534; Y02E 60/122; Y02T 10/7011
  See application file for complete search history.

(56) References Cited

U.S. PATENT DOCUMENTS

2006/0127758 A1  6/2006  Shishido et al.
2010/0233534 A1  9/2010  Iwama et al.
(Continued)

FOREIGN PATENT DOCUMENTS

CN  101188150  5/2008
CN  102511098 A  6/2012
(Continued)

OTHER PUBLICATIONS

International Search Report of corresponding PCT application PCT/JP2021/004735, dated Apr. 27, 2021.
(Continued)

*Primary Examiner* — Basia A Ridley
*Assistant Examiner* — Heng M. Chan
(74) *Attorney, Agent, or Firm* — K&L Gates LLP

(57) ABSTRACT

An electrically conductive base includes a holding body and covering particles. The holding body includes a first super engineering plastic having non-crystallinity. The covering particles are dispersed in the holding body, and each include a center part and a covering part. The center part includes an electrically conductive material. The covering part covers a surface of the center part and includes a second super engineering plastic having crystallinity.

6 Claims, 1 Drawing Sheet

(56) References Cited

U.S. PATENT DOCUMENTS

| | | |
|---|---|---|
| 2012/0189912 A1 | 7/2012 | Honda et al. |
| 2014/0370349 A1 | 12/2014 | Kwon et al. |
| 2015/0280241 A1 | 10/2015 | Hara et al. |
| 2016/0260966 A1 | 9/2016 | Ohsawa et al. |
| 2020/0014032 A1 | 1/2020 | Guichard et al. |

FOREIGN PATENT DOCUMENTS

| | | | |
|---|---|---|---|
| CN | 105612637 A | | 5/2016 |
| EP | 2 830 126 | | 1/2015 |
| JP | 2006172875 A | | 6/2006 |
| JP | 4349793 | | 7/2009 |
| JP | 2010073500 A | | 4/2010 |
| JP | 2010170833 A | * | 8/2010 |
| JP | 2010277862 A | | 12/2010 |
| JP | 2011090947 A | | 5/2011 |
| JP | 2014241229 A | | 12/2014 |
| JP | 2015519711 A | | 7/2015 |
| JP | 2020009764 A | | 1/2020 |
| JP | 2004123814 | | 4/2022 |
| WO | 2014050653 A1 | | 4/2014 |

OTHER PUBLICATIONS

European Search Report issued Apr. 2, 2024 in corresponding European Application No. 21760119.4.

Seul-A Park, Sustainable and recyclable super engineering thermoplastic from biorenewable monomer, Nature Communications, 2019.

Chinese Office Action dated Mar. 13, 2025 for corresponding Chinese application No. 202180016026.3 (3 pages).

Chinese Search Report dated Mar. 13, 2025 for corresponding Chinese application No. 202180016026.3 (3 pages).

* cited by examiner

ELECTRICALLY CONDUCTIVE BASE AND SECONDARY BATTERY

CROSS REFERENCE TO RELATED APPLICATIONS

The present application is a continuation of PCT patent application no. PCT/JP2021/004735, filed on Feb. 9, 2021, which claims priority to Japanese patent application no. JP2020-030309, filed on Feb. 26, 2020, the entire contents of which are incorporated herein by reference.

BACKGROUND

The present application relates to an electrically conductive base and a secondary battery.

Various kinds of electronic equipment, including mobile phones, have been widely used. Such widespread use has promoted development of a secondary battery as a power source that is smaller in size and lighter in weight and allows for a higher energy density. As the secondary battery, a bipolar secondary battery has been proposed in which a current flows in a vertical direction (a stacking direction of electrodes) via an electrically conductive base (a current collector). A reason for this is that such a secondary battery allows for a reduction in length of a conduction path for electrons and allows for a higher battery voltage.

A configuration of the current collector for use in the bipolar secondary battery has been considered in various ways. Specifically, in order to prevent a short circuit and suppress an increase in electrical resistance, an electrically conductive resin layer is disposed between two electrically conducive ion blocking layers, and the electrically conductive resin layer is electrically joined to the two electrically conductive ion blocking layers. Further, for higher electronic conductivity, an electrically conductive material is embedded in an organic structure in order to obtain electronic conductivity at least in a film thickness direction.

SUMMARY

The present application relates to an electrically conductive base and a secondary battery.

Consideration has been given in various ways to solve problems relating to a bipolar secondary battery; however, approaches to achieve compatibility between an electrical characteristic and a physical characteristic still remain insufficient, and there is still room for improvement in terms thereof.

The present technology has been made in view of such an issue, and relates to providing, in an embodiment, an electrically conductive base and a secondary battery that each make it possible to achieve compatibility between an electrical characteristic and a physical characteristic.

An electrically conductive base according to an embodiment of the present technology includes a holding body and covering particles. The holding body includes a first super engineering plastic having non-crystallinity. The covering particles are dispersed in the holding body, and each include a center part and a covering part. The center part includes an electrically conductive material. The covering part covers a surface of the center part and includes a second super engineering plastic having crystallinity.

A secondary battery according to an embodiment of the present technology includes the electrically conductive base according to the above-described embodiment of the technology as a current collector.

According to the electrically conductive base or the secondary battery of an embodiment of the present technology, the electrically conductive base includes the holding body (the first super engineering plastic having non-crystallinity) in which the covering particles are dispersed, and the covering particles each include the center part (the electrically conductive material) and the covering part (the second super engineering plastic having crystallinity). This makes it possible to achieve compatibility between the electrical characteristic and the physical characteristic.

Note that effects of the present technology are not necessarily limited to those described herein and may include any suitable effects in relation to the present technology.

DETAILED DESCRIPTION

The present technology is described below in further detail including with reference to the drawings.

A description is given first of an electrically conductive base according to an embodiment of the present technology.

The electrically conductive base described here is a support having electrical conductivity. The electrically conductive base is used to support an object to be supported and to ensure electrical conductivity (electronic conductivity) of the object to be supported.

Applications of the electrically conductive base are not particularly limited. Specific examples of the applications of the electrically conductive base include an electrode of an electronic device that needs to have an ability to collect current. The electronic device is not particularly limited in kind. Examples of the electronic device include a battery and a capacitor. Note that the battery may be a primary battery or a secondary battery. In a case where the application of the electrically conductive base is the electronic device, the object to be supported described above is an active material layer that causes electrode reactions to proceed. In a case where the electronic device is the secondary battery, the electrode reactions described above is charging and discharging reactions.

Figure 1:
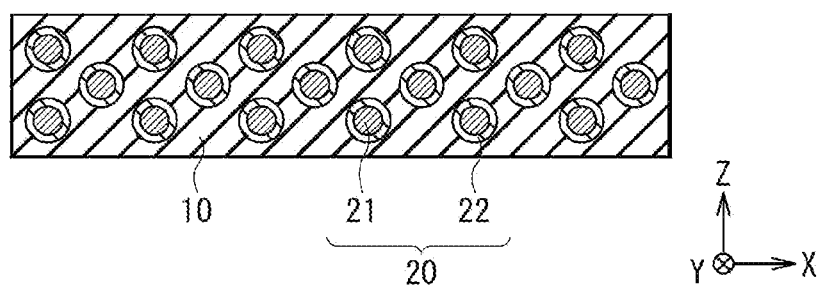
FIG. 1 is a schematic sectional view of a configuration of an electrically conductive base according to an embodiment of the present technology.

FIG. 1 schematically illustrates a sectional configuration of the electrically conductive base according to an embodiment of the present technology. In FIG. 1, dimensions (a length in an X-axis direction and a thickness in a Z-axis direction) of the electrically conductive base and a dimension (a particle size) of each of covering particles 20 are exaggerated or appropriately adjusted for easy understanding of the configuration of the electrically conductive base.

As illustrated in FIG. 1, the electrically conductive base includes a holding body 10 and the covering particles 20.

The holding body 10 holds the covering particles 20 in a state in which the covering particles 20 are dispersed therein.

The holding body 10 includes one or more of first super engineering plastics having non-crystallinity. The first super engineering plastic will hereinafter be referred to as a "first SEP". The term "super engineering plastic" is a generic term for a high heat-resistant plastic (a high heat-resistant resin) that is able to continuously exert a function based on a characteristic such as a physical characteristic even in a high-temperature environment at approximately 150° C. or higher. The "first SEP" is a super engineering plastic having non-crystallinity among the super engineering plastics described above.

As is apparent from FIG. 1, the holding body 10 is a base component of the electrically conductive base that holds the covering particles 20. The holding body 10 including the first SEP thus mainly performs a function of securing a physical characteristic of the electrically conductive base.

Specifically, the first SEP has non-crystallinity, in other words, does not have crystallinity because of having randomly-arranged molecular chains, and therefore has a superior physical property in terms of a physical characteristic such as a tensile strength or a flexural modulus.

Accordingly, in the holding body 10 including the first SEP, hardening and brittleness are suppressed and softness or flexibility is therefore secured. The holding body 10 thus secures physical durability (physical strength) of the electrically conductive base. In this case, the physical strength of the electrically conductive base is secured even if a content (an amount of dispersion) of center parts 21 in the holding body 10 described later increases, in particular.

Consequently, damage to the electrically conductive base is prevented by the holding body 10. Examples of the damage to the electrically conductive base include an occurrence of a crack, a rupture of the electrically conductive base, and a collapse of the electrically conductive base.

The first SEP is not particularly limited in kind, and may include any one or more of super engineering plastics having non-crystallinity. Specific examples of the first SEP include polyetherimide (PEI), polysulfone (PSU), polyphenylsulfone (PPSU), and polyarylate (PAR).

The dimensions (the length in the X-axis direction, a width in a Y-axis direction, and the thickness in the Z-axis direction) of the electrically conductive base are determined mainly in accordance with a length, a width, and a thickness of the holding body 10. The length, the width, and the thickness of the holding body 10 are not particularly limited, and may be freely chosen in accordance with, for example, the application of the electrically conductive base.

In this case, the holding body 10 may be sufficiently small in thickness and the electrically conductive base may thus be in the form of a film having flexibility, or the holding body 10 may be sufficiently large in thickness and the electrically conductive base may thus be in the form of a plate having rigidity.

The covering particles 20 are dispersed in the holding body 10 and held by the holding body 10. The covering particles 20 each include the center part 21 and a covering part 22.

The center part 21 includes one or more of electrically conductive materials. Accordingly, the center part 21 including the electrically conductive material mainly performs a function of securing the electrical conductivity of the electrically conductive base, and thus serves as a so-called electrically conductive filler.

The center part 21 is not particularly limited in shape. Specifically, the center parts 21 have one or more of shapes including, without limitation, a spherical shape (including an oval shape), a needle shape, a plate shape, a scaly shape, a tubular shape, a fibrous shape, a rod shape, and an indefinite shape. For simplifying the illustration, FIG. 1 illustrates the center parts 21 in a spherical shape.

The electrically conductive material is not particularly limited in kind. Specific examples of the electrically conductive material include a carbon material and a metal material. A reason for this is that superior electrical conductivity is obtainable.

Examples of the carbon material include a carbon nanofiber, carbon black, porous carbon, fullerene, graphene, a carbon nanotube, and a carbon microcoil. Examples of the carbon nanofiber include a vapor-grown carbon fiber (VGCF). Examples of the carbon black include Ketjen black and acetylene black. Examples of the carbon nanotube include a single-wall carbon nanotube (SWCNT) and a multi-wall carbon nanotube (MWCNT). Examples of the metal material include nickel and stainless steel.

The center part 21 preferably has a fibrous shape, in particular. A reason for this is that such a shape makes it easier for the center parts 21 to be electrically coupled to each other in the holding body 10 to facilitate formation of an electrically conductive path (an electron conduction path), thus improving the electrical conductivity of the electrically conductive base. Accordingly, the electrically conductive material is preferably a fibrous carbon material, and more specifically, a carbon nanofiber or a carbon nanotube, for example.

Dimensions (an average particle size and an average length) of the center part 21 are not particularly limited, and may be freely chosen in accordance with, for example, the application of the electrically conductive base. The "average particle size" is a median diameter D50 (μm).

The covering part 22 covers a surface of the center part 21. The covering part 22 may entirely cover the surface of the center part 21 or may partially cover the surface of the center part 21. In the latter case (partial covering), two or more covering parts 22 may cover the surface of the center part 21 at two or more locations separate from each other.

The covering part 22 includes one or more of second super engineering plastics having crystallinity. The second super engineering plastic will hereinafter be referred to as a "second SEP". The "second SEP" is a super engineering plastic having crystallinity among the super engineering plastics described above.

As is apparent from FIG. 1, the covering part 22 is interposed between the holding body 10 and the center part 21, and thus covers the surface of the center part 21. Accordingly, the covering part 22 including the second SEP mainly performs a function of securing an electrical characteristic of the electrically conductive base by electrochemically protecting the surface of the center part 21.

Specifically, the second SEP has crystallinity, in other words, has regularly-arranged molecular chains, and therefore has a superior physical property in terms of electrochemical stability.

Accordingly, in the covering part 22 including the second SEP, electrochemical durability is secured owing to lowered reactivity. The covering part 22 thus suppresses the occurrence of a side reaction on the surface of the center part 21. In this case, if the electrically conductive base is used together with an electrolytic solution in an application such as an electronic device, a decomposition reaction of the electrolytic solution on the surface of the center part 21 is suppressed.

Consequently, in a case where the electrically conductive base is applied to an electronic device including an electrolytic solution, electrochemical stability of the center part 21 is improved through the use of the covering part 22, and the electrical characteristic of the electrically conductive base is thus improved.

The second SEP is not particularly limited in kind, and may include any one or more of super engineering plastics having crystallinity. Specific examples of the second SEP include polyphenylenesulfide (PPS), polyetheretherketone (PEEK), polyethersulfone (PES), and polyamideimide (PAI).

A dimension of the covering part 22, that is, a covering thickness which is a dimension in a covering direction on the surface of the center part 21, is not particularly limited, and may be freely chosen in accordance with, for example, the application of the electrically conductive base.

Here, a mixture ratio between the holding body 10 (the first SEP) and the center parts 21 (the electrically conductive material) is not particularly limited. The content of the center parts 21 in the electrically conductive base is preferably sufficiently small, specifically in a range from 5 wt % to 25 wt % both inclusive, and more preferably, in a range from 5 wt % to 20 wt % both inclusive. A reason for this is that such a range allows sufficient electrical conductivity to be achieved by the center parts 21 while suppressing hardening and brittleness of the holding body 10, thus making it easier for the electrically conductive base to achieve both securing of physical strength and securing of electrical conductivity.

The content of the center parts 21 in the electrically conductive base described here represents what weight percent a weight of the center parts 21 corresponds to, where a sum total of a weight of the holding part 10 and a weight of the covering parts 22 is taken as 100 wt %.

A mixture ratio between the holding body 10 (the first SEP) and the covering parts 22 (the second SEP) is not particularly limited. A ratio R1 of the weight of the holding body 10 to the sum total of the weight of the holding body 10 and the weight of the covering parts 22 is preferably greater than a ratio R2 of the weight of the covering part 22 to the sum total of the weight of the holding body 10 and the weight of the covering parts 22. A reason for this is that such a relationship allows sufficient softness to be achieved by the holding body 10 while allowing reactivity on the surface of the center part 21 to be sufficiently suppressed by the covering part 22, thus making it easier for the electrically conductive base to achieve both securing of physical strength and securing of electrochemical stability.

In the electrically conductive base, the electrical conductivity is exhibited by the center part 21 (the electrically conductive material) of each of the covering particles 20.

In this case, as described above, because the covering part 22 (the second SEP) covers the surface of the center part 21, the occurrence of the side reaction on the surface of the center part 21 is suppressed by the covering part 22. Further, because the covering particles 20 (the center parts 21 and the covering parts 22) are dispersed in the holding body 10 (the first SEP), the softness of the electrically conductive base is secured by the holding body 10.

In a case of manufacturing the electrically conductive base, the covering particles 20 are fabricated and thereafter the electrically conductive base is fabricated using the covering particles 20, as described below.

First, the center parts 21 (the electrically conductive material in powder form) and pellets of the second SEP are mixed together to thereby obtain a mixture. Thereafter, by means of a melt extruder such as a twin-screw extruder, the mixture is kneaded under heating, and is shaped. In this case, the mixture is heated at a temperature higher than a melt temperature (a melting point) of the second SEP to thereby melt the second SEP.

The center parts 21 are thereby dispersed in the melt of the second SEP, and the melt of the second SEP thus adheres to the surface of each of the center parts 21. Accordingly, the covering part 22 including the second SEP is formed to cover the surface of the center part 21. The covering particles 20 each including the center part 21 and the covering part 22 are thus fabricated.

Thereafter, the covering particles 20 and pellets of the first SEP are mixed together to thereby obtain a mixture. Thereafter, by means of an extruder such as a T-die extruder, the mixture is kneaded under heating, and is shaped into a film shape or a plate shape. In this case, the mixture is heated at a temperature higher than a melt temperature (a melting point) of the first SEP to thereby melt the first SEP.

The melt of the first SEP is thereby shaped into the film shape or the plate shape with the covering particles 20 being dispersed in the melt of the first SEP. Accordingly, the covering particles 20 are held by the holding body 10 including the first SEP. The electrically conductive base including the holding body 10 and the covering particles 20 is thus completed.

According to the electrically conductive base, the covering particles 20 are dispersed in the holding body 10 (the first SEP having non-crystallinity), and the covering particles 20 each include the center part 21 (the electrically conductive material) and the covering part 22 (the second SEP having crystallinity).

In this case, as described above, softness is secured by the holding body 10 (the first SEP) and the occurrence of a side reaction is suppressed by the covering part 22 (the second SEP) while electrical conductivity is secured by the center part 21 (the electrically conductive material). As a result, the physical characteristic of the electrically conductive base is stabilized by virtue of the securing of softness, and the electrical characteristic of the electronic device including the electrically conductive base improves by virtue of the suppression of the occurrence of a side reaction. Accordingly, it is possible to achieve compatibility between the electrical characteristic and the physical characteristic.

In particular, the first SEP may include, for example, polyetherimide, and the second SEP may include, for example, polyphenylenesulfide. This allows the holding body 10 to achieve sufficient softness, and allows the covering part 22 to sufficiently suppress the occurrence of a side reaction. Accordingly, it is possible to achieve higher effects.

Further, the electrically conductive material may include the fibrous carbon material. This facilitates the formation of the electrically conductive path to thereby improve the electrical conductivity of the electrically conductive base. Accordingly, it is possible to achieve higher effects.

Further, the ratio R1 may be greater than the ratio R2. This makes it easier for the electrically conductive base to achieve both the securing of physical strength and the securing of electrochemical stability. Accordingly, it is possible to achieve higher effects.

Next, a description is given of a secondary battery according to an embodiment of the present technology as an example of the applications of the electrically conductive base described above. In the secondary battery, the electrically conductive base is used as a current collector for collecting current in an electrode.

The secondary battery to be described here is a bipolar secondary battery including a positive electrode active material layer and a negative electrode active material layer together with the current collector. The secondary battery obtains a battery capacity using insertion and extraction of an electrode reactant. In this case, in order to prevent precipitation of the electrode reactant on a surface of the negative electrode active material layer during charging, a charge capacity of the negative electrode active material layer is greater than a discharge capacity of the positive electrode active material layer. In other words, an electrochemical capacity per unit area of the negative electrode active material layer is set to be greater than an electrochemical capacity per unit area of the positive electrode active material layer.

Although not particularly limited in kind, the electrode reactant is a light metal such as an alkali metal or an alkaline earth metal. Examples of the alkali metal include lithium, sodium, and potassium. Examples of the alkaline earth metal include beryllium, magnesium, and calcium.

An example is given below of a case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Figure 2:
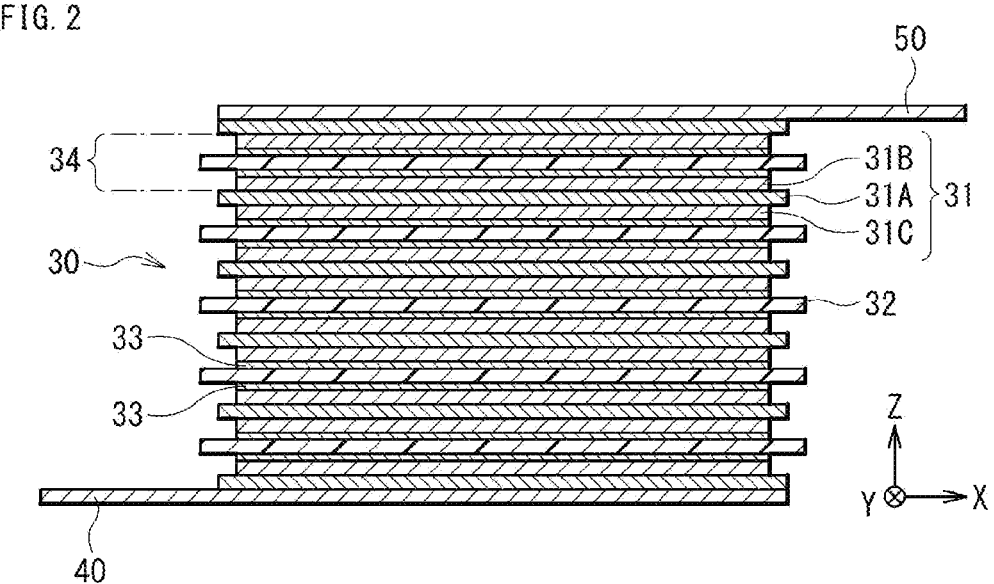
FIG. 2 is a sectional view of a configuration of a secondary battery according to an embodiment of the present technology.

FIG. 2 illustrates a sectional configuration of the secondary battery according to an embodiment of the present technology. As illustrated in FIG. 2, the secondary battery includes a battery device 30, a positive electrode lead 40, and a negative electrode lead 50.

The battery device 30 is a main part that causes electrode reactions, that is, charging and discharging reactions, to proceed. Mainly, the battery device 30 has a multilayer structure in which electrodes 31 are stacked one by one in a height direction (the Z-axis direction) with a separator 32 and an electrolyte layer 33 interposed therebetween. More specifically, the electrodes 31 are stacked one by one with the separator 32 interposed therebetween, and the electrolyte layer 33 is interposed between the electrode 31 and the separator 32. Here, the battery device 30 includes two or more electrodes 31, two or more separators 32, and two or more electrolyte layers 33.

The electrode 31 includes a current collector 31A having two surfaces (one surface and the other surface) facing toward opposite directions, a positive electrode active material layer 31B disposed on the one surface of the current collector 31A, and a negative electrode active material layer 31C disposed on the other surface of the current collector 31A. In other words, the electrode 31 is a double-sided electrode in which the active material layers (the positive electrode active material layer 31B and the negative electrode active material layer 31C) are disposed on the two respective opposite surfaces of the current collector 31A. The current collector 31A has a configuration similar to that of the electrically conductive base described above.

The positive electrode active material layer 31B, the current collector 31A, and the negative electrode active material layer 31C are stacked in this order. The current collector 31A is thus interposed between the positive electrode active material layer 31B and the negative electrode active material layer 31C which have mutually opposite polarities. As described above, the electrode 31 is a bipolar electrode including the positive electrode active material layer 31B and the negative electrode active material layer 31C which have mutually opposite polarities.

Note that, among a plurality of electrodes 31, the electrode 31 closest to the positive electrode lead 40, that is, the lowermost electrode 31 in the height direction, is a single-sided electrode in which the negative electrode active material layer 31C is not disposed on the current collector 31A and only the positive electrode active material layer 31B is disposed on the current collector 31A. This is for the purpose of electrically coupling the positive electrode active material layer 31B to the positive electrode lead 40 via the current collector 31A.

Further, among the plurality of electrodes 31, the electrode 31 closest to the negative electrode lead 50, that is, the uppermost electrode 31 in the height direction, is a single-sided electrode in which the positive electrode active material layer 31B is not disposed on the current collector 31A and only the negative electrode active material layer 31C is disposed on the current collector 31A. This is for the purpose of electrically coupling the negative electrode active material layer 31C to the negative electrode lead 50 via the current collector 31A.

Here, put another way, the battery device 30 has a multilayer structure in which electrode elements 34 are stacked one by one with one current collector 31A interposed between every two adjacent electrode elements 34 in the height direction to allow an uppermost layer and a lowermost layer to be two respective current collectors 31A. Here, the battery device 30 includes a plurality of electrode elements 34 and a plurality of current collectors 31A.

The electrode element 34 includes the current collector 31A, the positive electrode active material layer 31B disposed over the one surface of the current collector 31A with one electrolyte layer 33 interposed therebetween, and the negative electrode active material layer 31C disposed over the other surface of the current collector 31A with another electrolyte layer 33 interposed therebetween.

In other words, the positive electrode active material layer 31B, the one electrolyte layer 33, the separator 32, the other electrolyte layer 33, and the negative electrode active material layer 31C are stacked in this order. The separator 32 is thus disposed between the positive electrode active material layer 31B and the negative electrode active material layer 31C. Further, the one electrolyte layer 33 (a first electrolyte layer) is interposed between the positive electrode active material layer 31B and the separator 32, and the other electrolyte layer 33 (a second electrolyte layer) is interposed between the negative electrode active material layer 31C and the separator 32.

The number of the electrode elements 34 to be stacked is not particularly limited, and may be freely chosen. For simplifying the illustration, FIG. 2 illustrates a case where the number of the stacked electrode elements 34 is five.

The positive electrode active material layer 31B includes one or more of positive electrode active materials into which lithium is insertable and from which lithium is extractable, and may further include, for example, a positive electrode binder and a positive electrode conductor.

Although not particularly limited in kind, the positive electrode active material is a lithium-containing compound, such as a lithium transition metal compound. The lithium transition metal compound includes lithium and one or more transition metal elements, and may further include one or more other elements. The other elements may be any elements other than transition metal elements, and are not particularly limited in kind. The other elements preferably belong to groups 2 to 15 in the long period periodic table of elements, in particular. The lithium transition metal compound may be an oxide, or may be one of, for example, a phosphoric acid compound, a silicic acid compound, or a boric acid compound.

Specific examples of the oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, $LiMn_2O_4$, and $Li_4Ti_5O_{12}$. Specific examples of the phosphoric acid compound include $LiFePO_4$, $LiMnPO_4$, $LiFe_{0.5}Mn_{0.5}PO_4$, and $LiFe_{0.3}Mn_{0.7}PO_4$.

The positive electrode binder includes one or more of materials including, without limitation, a synthetic rubber and a polymer compound. Examples of the synthetic rubber include a styrene-butadiene-based rubber. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. The electrically conductive material may be a metal material or an electrically conductive polymer, for example.

The negative electrode active material layer 31C includes one or more of negative electrode active materials into which lithium is insertable and from which lithium is extractable, and may further include, for example, a negative electrode binder and a negative electrode conductor. Respective details of the negative electrode binder and the negative electrode conductor are similar to the respective details of the positive electrode binder and the positive electrode conductor.

The negative electrode active material is not particularly limited in kind. Examples of the negative electrode active material include a carbon material and a metal-based material. Examples of the carbon material include graphitizable carbon, non-graphitizable carbon, and graphite. Examples of the graphite include natural graphite and artificial graphite. The metal-based material is a material that includes one or more elements among metal elements and metalloid elements that are each able to form an alloy with lithium. Specific examples of such metal elements and metalloid elements include silicon and tin. The metal-based material may be a simple substance, an alloy, a compound, a mixture of two or more thereof, or a material including two or more phases thereof.

Specific examples of the metal-based material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$ or $0.2<v<1.4$), $LiSiO$, $SnOw$ ($0<w\leq2$), $SnSiO_3$, $LiSnO$, and $Mg_2Sn$.

The separator 32 is an insulating porous film that separates the positive electrode active material layer 31B and the negative electrode active material layer 31C from each other, and includes one or more of polymer compounds including, without limitation, polyethylene and polypropylene. The separator 32 serves as an ion barrier that permits movement of electrons and inhibits movement of ions (lithium ions). The separator 32 may be a nonwoven fabric including one or more kinds of fibers including, without limitation, aramid fibers, glass fibers, and nylon fibers.

The electrolyte layer 33 is a gel electrolyte including an electrolytic solution and a polymer compound. In the electrolyte layer 33, the electrolytic solution is held by the polymer compound. A reason for this is that a high ionic conductivity is obtainable and leakage of the electrolytic solution is prevented.

The electrolytic solution includes a solvent and an electrolyte salt. The solvent includes one or more of nonaqueous solvents (organic solvents) including, without limitation, a carbonic-acid-ester-based compound, a carboxylic-acid-ester-based compound, and a lactone-based compound. The electrolyte salt includes one or more of light metal salts including, without limitation, a lithium salt. The polymer compound includes one or more of polymer compounds including, without limitation, polyvinylidene difluoride.

As described above, the positive electrode lead 40 is coupled via the current collector 31A to the lowermost electrode 31 (the positive electrode active material layer 31B) which is a single-sided electrode, and is thus electrically coupled to the positive electrode active material layer 31B. As described above, the negative electrode lead 50 is coupled via the current collector 31A to the uppermost electrode 31 (the negative electrode active material layer 31C) which is a single-sided electrode, and is thus electrically coupled to the negative electrode active material layer 31C.

Here, the positive electrode lead 40 extends more outward than the battery device 30, and the negative electrode lead 50 extends more outward than the battery device 30 in a direction opposite to a direction in which the positive electrode lead 40 is led out. However, the positive electrode lead 40 and the negative electrode lead 50 may extend in a common direction. The positive electrode lead 40 and the negative electrode lead 50 each include one or more of electrically conductive materials. Examples of the electrically conductive material include aluminum, copper, nickel, and stainless steel. The positive electrode lead 40 and the negative electrode lead 50 each have, for example, a thin plate shape or a meshed shape.

Note that the secondary battery may further include one or more of other components which are not illustrated.

Examples of the other components include an outer package member to contain the battery device 30. The outer package member may be a metal can having rigidity or an outer package film having softness, or may be any other outer package member. In a case where the battery device 30 is contained inside the outer package member, the positive electrode lead 40 and the negative electrode lead 50 are each led out from inside to outside the outer package member.

Upon charging the secondary battery, lithium is extracted from the positive electrode active material layer 31B, and the extracted lithium is inserted into the negative electrode active material layer 31C via the electrolyte layer 33. Upon discharging the secondary battery, lithium is extracted from the negative electrode active material layer 31C, and the extracted lithium is inserted into the positive electrode active material layer 31B via the electrolyte layer 33. Upon the charging and the discharging, lithium is inserted and extracted in an ionic state.

In a case of manufacturing the secondary battery, the electrode element 34 is fabricated and thereafter the secondary battery is fabricated using the electrode element 34 in accordance with the following procedure.

First, a mixture of the positive electrode active material and other materials including, without limitation, the positive electrode binder and the positive electrode conductor, that is, a positive electrode mixture, is put into a solvent such as an organic solvent to thereby prepare a paste positive electrode mixture slurry. Thereafter, the positive electrode mixture slurry is applied on a surface of a release base to thereby form the positive electrode active material layer 31B. The release base is a base having a release-treated surface. Examples of the release base include a metal foil and a polymer film. The details of the release base described here similarly apply to the following description. Thereafter, the positive electrode active material layer 31B may be compression-molded by means of a machine such as a roll pressing machine on an as-needed basis. In this case, the positive electrode active material layer 31B may be heated. The positive electrode active material layer 31B may be compression-molded multiple times. Lastly, the positive electrode active material layer 31B is peeled away from the release base. Note that the positive electrode active material layer 31B may be peeled away from the release base not at this time but in a fabrication process of the electrode element 34 to be described later.

The negative electrode active material layer 31C is fabricated in accordance with a procedure similar to the fabrication procedure of the positive electrode active material layer 31B described above. Specifically, a mixture of the negative electrode active material and other materials including, without limitation, the negative electrode binder and the negative electrode conductor, that is, a negative electrode mixture, is put into a solvent such as an organic solvent to thereby prepare a paste negative electrode mixture slurry. Thereafter, the negative electrode mixture slurry is applied on a surface of a release base to thereby form the negative electrode active material layer 31C. Thereafter, the negative electrode active material layer 31C may be compression-molded on an as-needed basis. Lastly, the negative electrode active material layer 31C is peeled away from the release base. Note that the negative electrode active material layer 31C may be peeled away from the release base not at this time but in the fabrication process of the electrode element 34 to be described later.

First, the electrolyte salt is added to the solvent to thereby prepare the electrolytic solution. Thereafter, the polymer compound, the electrolytic solution, and, on an as-needed basis, an additional organic solvent are mixed together to thereby prepare a coating solution in sol form. Lastly, the coating solution is applied on the surface of the positive electrode active material layer 31B to thereby fabricate the first electrolyte layer 33 in gel form, and the coating liquid is applied on the surface of the negative electrode active material layer 31C to thereby fabricate the second electrolyte layer 33 in gel form.

First, on a release base, the positive electrode active material layer 31B with the first electrolyte layer 33 formed thereon, the separator 32, and the negative electrode active material layer 31C with the second electrolyte layer 33 formed thereon are stacked in this order to thereby fabricate a stacked body. In this case, the two electrolyte layers 33 are opposed to each other with the separator 32 interposed therebetween. Thereafter, the stacked body is pressed under heating (heat-pressed) in the stacking direction by means of a machine such as a pressing machine. Conditions including, without limitation, a heating temperature and a pressing pressure in performing the heat pressing may be freely chosen. The details of the heat pressing described here similarly apply to the following description. As a result, the positive electrode active material layer 31B is closely attached to the separator 32 with the first electrolyte layer 33 interposed therebetween, and the negative electrode active material layer 31C is closely attached to the separator 32 with the second electrolyte layer 33 interposed therebetween. The electrode element 34 is thus fabricated. Lastly, the release base is peeled away from the electrode element 34 (the positive electrode active material layer 31B and the negative electrode active material layer 31C).

First, on a release base, the electrode elements 34 are stacked one by one with one current collector 31A interposed between every adjacent two of the electrode elements 34 to thereby fabricate a stacked body. In this case, the stacking is performed to allow the lowermost layer and the uppermost layer to be two respective current collectors 31A. Thereafter, the stacked body is heat-pressed in the stacking direction by means of a machine such as a pressing machine. The electrode elements 34 are thereby closely attached to each other with the current collector 31A interposed therebetween. The battery device 30 is thus fabricated. Thereafter, the release base is peeled away from the battery device 30. Lastly, the positive electrode lead 40 is coupled to the current collector 31A of the lowermost layer by a method such as a welding method, and the negative electrode lead 50 is coupled to the current collector 31A of the uppermost layer by a method such as a welding method. The welding method includes one or more of a laser welding method, a resistance welding method, or any other welding method.

The secondary battery after being assembled is charged and discharged. Various conditions including an environment temperature, the number of times of charging and discharging (the number of cycles), and charging and discharging conditions may be freely chosen. Through this process, a film is formed on the surface of, for example, the negative electrode active material layer 31C. This electrochemically stabilizes the state of the secondary battery. The secondary battery including the electrode element 34, that is, the bipolar secondary battery, is thus completed.

According to this secondary battery, the current collector 31A has a configuration similar to the configuration of the electrically conductive base described above. In this case, as described above, the physical characteristic of the current collector 31A is stabilized by virtue of the securing of softness, and the electrical characteristic of the secondary battery that uses the current collector 31A improves by virtue of the suppression of the occurrence of a side reaction (the decomposition reaction of the electrolytic solution). Compatibility between the electrical characteristic and the physical characteristic is thus achieved by the current collector 31A. Accordingly, it is possible to achieve a superior cyclability characteristic.

In this case, the suppression of the decomposition reaction of the electrolytic solution allows for a decrease in the amount of formation of an unwanted film that would result from a reductive decomposition of the electrolytic solution. This prevents the secondary battery from easily increasing in electrical resistance even if exposed to a reducing atmosphere. Accordingly, it is possible to achieve a sufficient and stable cyclability characteristic.

Other action and effects related to the secondary battery are similar to those related to the electrically conductive base described above.

Next, a description is given of modifications of each of the electrically conductive base and the secondary battery described above according to an embodiment. The respective configurations of the electrically conductive base and the secondary battery are appropriately modifiable, as will be described below. Note that any two or more of the following series of modifications may be combined.

The electrolyte layer 33 which is a gel electrolyte is used as an electrolyte serving to mediate the charging and discharging reactions. However, the electrolytic solution which is a liquid electrolyte may be used by itself instead of the electrolyte layer 33.

The configuration of the secondary battery that uses the electrolytic solution is similar to the configuration of the secondary battery that uses the electrolyte layer 33, except that the electrolyte layer 33 is omitted and that the positive electrode active material layer 31B, the negative electrode active material layer 31C, and the separator 32 are each impregnated with the electrolytic solution.

A method of manufacturing the secondary battery that uses the electrolytic solution is similar to the method of manufacturing the secondary battery that uses the electrolyte layer 33, except that the stacked body is fabricated without using the electrolyte layer 33 and thereafter the stacked body is impregnated with the electrolytic solution. Note that in a case of using the outer package member for containing the battery device 30, the stacked body is placed into the outer package member having a pouch shape, following which the electrolytic solution is injected into the pouch-shaped outer package member to thereby impregnate the stacked body with the electrolytic solution.

In this case also, lithium is inserted into and extracted from each of the positive electrode active material layer 31B and the negative electrode active material layer 31C via the electrolytic solution. Accordingly, it is possible to achieve similar effects.

The porous film is used as the separator 32. However, the separator 32 may have a multilayer structure including a porous film and a polymer compound layer.

The separator 32 having the multilayer structure includes a porous film having two surfaces (one surface and the other surface) facing toward opposite directions, and a polymer compound layer disposed on one of or each of the one surface and the other surface of the porous film. A reason for this is that this makes it easier for the porous film to be closely attached to the positive electrode active material layer 31B, the negative electrode active material layer 31C, or both via the polymer compound layer(s). Accordingly, the occurrence of a stacking misalignment of the battery device 30 is suppressed, and the battery device 30 is thereby prevented from easily swelling even if, for example, the decomposition reaction of the electrolytic solution occurs.

The polymer compound layer includes a polymer compound and inorganic particles. The inorganic particles are dispersed in the polymer compound. A reason for this is that the inorganic particles dissipate heat upon heat generation by the secondary battery, and this improves the heat resistance and safety of the secondary battery. The polymer compound includes one or more of polymer compounds including, without limitation, polyvinylidene difluoride. The inorganic particles include one or more of inorganic materials including, without limitation, aluminum oxide (alumina), aluminum nitride, boehmite, silicon oxide (silica), titanium oxide (titania), magnesium oxide (magnesia), and zirconium oxide (zirconia).

In this case also, the positive electrode active material layer 31B and the negative electrode active material layer 31C are separated from each other by the separator 32 to permit the movement of electrons and inhibit the movement of ions. Accordingly, it is possible to achieve similar effects. In this case, as described above, swelling of the secondary battery resulting from the swelling of the battery device 30 is suppressed, and the heat resistance and safety of the secondary battery are improved, in particular.

The inorganic particles may be included not only in the polymer compound but also in the porous film. A reason for this is that this further suppresses the swelling of the secondary battery and further improves the heat resistance and safety of the secondary battery.

EXAMPLES

A description will be given of Examples of the present technology according to an embodiment.

Experiment Examples 1 to 7

As described below, electrically conductive bases (FIG. 1) were fabricated, and bipolar secondary batteries (FIG. 2) were fabricated using the electrically conductive bases (the current collectors 31A), following which the electrically conductive bases were evaluated for physical property, and the secondary batteries were evaluated for battery characteristic.

[Fabrication of Electrically Conductive Base]

First, the center parts 21 (fibers of VGCF as the electrically conductive material having an average diameter of 0.15 μm and an average length of 10 μm) and pellets of the second SEP were mixed together to thereby obtain a mixture. Used as the second SEP were polyphenylenesulfide (PPS) and polyetheretherketone (PEEK).

In this case, as described in Table 1, a mixture ratio (a weight ratio) between the center parts 21 and the pellets (the second SEP) was adjusted. For the mixture ratio of the center parts 21, adjustment of the mixture ratio of the center parts 21 was performed to finally bring the content (wt %) of the center parts 21 in the electrically conductive base to the value listed in Table 1. For the mixture ratio of the pellets (the second SEP), adjustment of the mixture ratio of the pellets was performed to bring the ratio R2 to the values listed in Table 1.

Thereafter, the mixture was put into a melt extruder (a twin-screw extruder), following which the mixture was kneaded using the melt extruder under heating at a heating temperature of 320° C. or higher to thereby shape the mixture. In this case, the heating temperature was adjusted in accordance with the kind of the second SEP. The covering parts 22 including the second SEP were thereby formed to cover the surfaces of the center parts 21. The covering particles 20 each including the center part 21 and the covering part 22 were thus obtained.

Thereafter, the covering particles 20 and pellets of the first SEP were mixed together to thereby obtain a mixture. Used as the first SEP were polyetherimide (PEI) and polysulfone (PSU).

In this case, as described in Table 1, a mixture ratio (a weight ratio) between the covering particles 20 and the pellets (the first SEP) was adjusted. For the mixture ratio of the pellets (the first SEP), adjustment of the mixture ratio of the pellets was performed to bring the ratio R1 to the values listed in Table 1.

Lastly, the mixture was put into an extruder (a T-die extruder), following which the mixture was kneaded using the extruder under heating at a heating temperature of 320° C. or higher to thereby extrude the mixture into a film. In this case, the heating temperature was adjusted in accordance with the kind of the first SEP. The covering particles 20 were thereby dispersed in the holding body 10 including the first SEP. The electrically conductive base including the holding body 10 and the covering particles 20 was thus completed.

For comparison, as described in Table 1, an electrically conductive base was fabricated by a similar procedure except that the pellets of the second SEP serving as the material of the covering parts 22 were not used and the second SEP (PPS) was used instead of the first SEP as the material of the holding body 10. Further, for comparison, an electrically conductive base was fabricated by a similar procedure except that the pellets of the second SEP serving as the material of the covering parts 22 were not used. In these cases, no covering parts 22 were formed, which resulted in the electrically conductive base including the holding body 10 and the center parts 21.

[Fabrication of Secondary Battery]

In accordance with the following procedure, the secondary batteries were fabricated using the electrically conductive bases described above as the respective current collectors 31A.

[Fabrication of Positive Electrode Active Material Layer]

First, 96 parts by mass of the positive electrode active material (lithium cobalt oxide ($LiCoO_2$)), 3 parts by mass of the positive electrode binder (polyvinylidene difluoride), and 1 part by mass of the positive electrode conductor (carbon black) were mixed together to thereby obtain a positive electrode mixture. Thereafter, the positive electrode mixture was put into a solvent (N-methyl-2-pyrrolidone which is an organic solvent), following which the solvent was stirred to thereby prepare a paste positive electrode mixture slurry. Thereafter, the positive electrode mixture slurry was applied on the surface of a release base (a release film), following which the applied positive electrode mixture slurry was dried to thereby form the positive electrode active material layer 31B. Lastly, the positive electrode active material layer 31B was compression-molded by means of a roll pressing machine, following which the positive electrode active material layer 31B was dried under vacuum.

[Fabrication of Negative Electrode Active Material Layer]

First, 90 parts by mass of the negative electrode active material (artificial graphite) and 10 parts by mass of the negative electrode binder (polyvinylidene difluoride) were mixed together to thereby obtain a negative electrode mixture. Thereafter, the negative electrode mixture was put into a solvent (N-methyl-2-pyrrolidone which is an organic solvent), following which the solvent was stirred to thereby prepare a paste negative electrode mixture slurry. Thereafter, the negative electrode mixture slurry was applied on the surface of a release base (a release film), following which the applied negative electrode mixture slurry was dried to thereby form the negative electrode active material layer 31C. Lastly, the negative electrode active material layer 31C was compression-molded by means of a roll pressing machine, following which the negative electrode active material layer 31C was dried under vacuum.

[Fabrication of Electrolyte Layer]

First, the electrolyte salt (lithium hexafluorophosphate ($LiPF_6$)) was added to the solvent (ethylene carbonate and propylene carbonate), following which the solvent was stirred. A mixture ratio (a weight ratio) between ethylene carbonate and propylene carbonate was set to 50:50, and a content of the electrolyte salt with respect to the solvent was set to 1 mol/kg.

Thereafter, 2 parts by mass of the polymer compound (polyvinylidene difluoride), 31 parts by mass of the electrolytic solution, and 67 parts by mass of an additional solvent (dimethyl carbonate which is an organic solvent) were mixed together, following which the additional solvent was stirred to thereby prepare the coating solution in sol form.

Lastly, the coating solution was applied on the surface of the positive electrode active material layer 31B formed on the release film, following which the coating solution was dried, that is, the additional solvent was volatilized and removed to thereby fabricate the first electrolyte layer 33. Further, the coating solution was applied on the surface of the negative electrode active material layer 31C formed on the release film, following which the coating solution was dried, that is, the additional solvent was volatilized and removed, to thereby fabricate the second electrolyte layer 33.

[Fabrication of Electrode Element]

First, a stack of the positive electrode active material layer 31B and the first electrolyte layer 33 formed on the release film and a stack of the negative electrode active material layer 31C and the second electrolyte layer 33 formed on the release film were stacked on each other with the separator 32 (a fine porous polyethylene film having a thickness of 15 µm) interposed therebetween to thereby fabricate a stacked body. Thereafter, the stacked body was heat-pressed by means of a pressing machine at a heating temperature of 105° C. for a pressing time of 3 seconds to thereby fabricate the electrode element 34. Lastly, the release films were peeled away from the electrode element 34 (the positive electrode active material layer 31B and the negative electrode active material layer 31C).

[Assembly of Secondary Battery]

First, a stacked body was fabricated by stacking the electrode elements 34 one by one with one current collector 31A (electrically conductive base) interposed between every adjacent two of the electrode elements 34 to allow the uppermost layer and the lowermost layer to be two respective current collectors 31A. In this case, the number of the electrode elements 34 to be stacked was set to five. Thereafter, the stacked body was heat-pressed by means of a pressing machine at a heating temperature of 105° C. for a pressing time of 3 seconds. Lastly, the positive electrode lead 40 including stainless steel was coupled to the current collector 31A of the lowermost layer by a laser welding method, and the negative electrode lead 50 including stainless steel was coupled to the current collector 31A of the uppermost layer by a laser welding method.

[Stabilization of Secondary Battery]

The secondary battery was charged and discharged in an ambient temperature environment (at a temperature of 23° C.). Upon the charging, the secondary battery was charged with a constant current of 0.1 C until a battery voltage reached 4.45 V, and was thereafter charged with a constant voltage of 4.45 V until a current reached 0.02 C. Upon the discharging, the secondary battery was discharged with a constant current of 0.1 C until the battery voltage reached 3.0 V. Note that 0.1 C is a value of a current that causes a battery capacity (a theoretical capacity) to be completely discharged in 10 hours, and 0.02 C is a value of a current that causes the battery capacity to be completely discharged in 50 hours.

As a result, a film was formed on the surface of, for example, the negative electrode active material layer 31C, and the state of the secondary battery was thereby stabilized. The bipolar secondary battery (a lithium-ion secondary battery) was thus completed.

[Evaluation of Physical Property of Electrically Conductive Base and Battery Characteristic of Secondary Battery]

The electrically conductive bases were evaluated for physical property (electrical characteristic and physical characteristic), and the secondary batteries were evaluated for battery characteristic (cyclability characteristic). The results obtained are presented in Table 1.

(Electrical Characteristic of Electrically Conductive Base)

First, an electrical resistivity of the electrically conductive base was measured as an initial resistivity (SI cm) in an ambient temperature environment in accordance with JIS K 7194.

Thereafter, a test secondary battery (a half cell) was fabricated using the electrically conductive base as an electrode. The test secondary battery included the electrically conductive base as a working electrode, and a lithium metal plate as a counter electrode. Thereafter, a reduction float test was performed using the test secondary battery. Specifically, the test secondary battery was continuously charged in a high temperature environment (at a temperature of 60° C.). Upon the charging, the test secondary battery was charged with a constant current and a constant voltage until the battery voltage reached 4.3 V (versus a lithium reference electrode) while an oxidation reaction was in progress, and until the battery voltage reached 0.0 V (versus the lithium reference electrode) while a reduction reaction was in progress. The test secondary battery was thus charged until a total charging time reached 100 hours.

Thereafter, the electrically conductive base (the working electrode) was collected from the test secondary battery by disassembling the test secondary battery after the end of the reduction float test, following which the electrically conductive base was washed with organic solvents (dimethyl carbonate and ethanol). In this case, dimethyl carbonate and ethanol were used in this order to successively wash the electrically conductive base.

Lastly, the electrical resistivity of the electrically conductive base was measured again as a post-storage resistivity (Ω·cm) in an ambient temperature environment, and thereafter the following was calculated: resistivity ratio=post-storage resistivity/initial resistivity.

(Physical Characteristic of Electrically Conductive Base)

An elongation at break (%) of the electrically conductive base was measured in accordance with JIS K 7127, "Plastics—Determination of tensile properties—Part 3: Test conditions for films and sheets".

(Cyclability Characteristic of Secondary Battery)

First, the secondary battery was charged and discharged in an ambient temperature environment to thereby measure a discharge capacity (a first-cycle discharge capacity). Thereafter, the secondary battery was repeatedly charged and discharged in the same environment until the number of cycles reached 300 to thereby measure the discharge capacity (a 300th-cycle discharge capacity). Lastly, the following was calculated: capacity retention rate (%)=(300th-cycle discharge capacity/first-cycle discharge capacity)×100. Charging and discharging conditions were similar to those in stabilizing the secondary battery described above.

the covering part 22 including the second SEP covered the surface of the center part 21 (Experiment examples 1 to 5), a low resistivity ratio was achieved to suppress an increase in electrical resistance, and a high elongation at break was achieved to secure softness. Accordingly, a high capacity retention rate was achieved in the secondary battery in which the electrically conductive base (Experiment examples 1 to 5) was used as the current collector 31A.

In this case, if the ratio R1 was greater than the ratio R2 (Experiment examples 1 and 2), in particular, the elongation at break further increased with the capacity retention rate remaining high, as compared with a case where the ratios R1 and R2 were equal to each other (Experiment example 5).

In contrast, in a case of using the electrically conductive base different from the above-described electrically conductive base (Experiment examples 6 and 7), the resistivity ratio increased or the elongation at break was insufficient.

Specifically, in a case where no covering part 22 covered the surface of the center part 21 (Experiment example 7), the resistivity ratio significantly increased although a high elongation at break was achieved. As a result, a high capacity retention rate was not achieved in the secondary battery in which the electrically conductive base (Experiment example 7) was used as the current collector 31A.

In a case where no covering part 22 covered the surface of the center part 21 and the holding body 10 included the second SEP instead of the first SEP (Experiment example 6), the elongation at break was 0% although the resistivity ratio was low. As a result, in the secondary battery in which the electrically conductive base (Experiment example 6) was used as the current collector 31A, the capacity retention rate was not calculable because the secondary battery broke due to insufficient softness upon charging and discharging.

The results presented in Table 1 indicate that if the electrically conductive base included the covering particles 20 dispersed in the holding body 10 (the first SEP having non-crystallinity) and the covering particles 20 each included the center part 21 (the electrically conductive material) and the covering part 22 (the second SEP having crystallinity), the electrically conductive base achieved a high elongation at break with the resistivity ratio being low.

TABLE 1

| Experiment example | Holding body | | Covering particle | | | | | Post- | | Elongation at break (%) | Capacity retention rate (%) |
| | | | Center part | | Covering part | | | | | | |
| | First SEP | Second SEP | Ratio R1 (wt %) | Electrically conductive material | Content (wt %) | Second SEP | Ratio R2 (wt %) | Initial resistivity (Ω·cm) | storage resistivity (Ω·cm) | Resistivity ratio | | |
| 1 | PEI | — | 90 | VGCF | 20 | PPS | 10 | 13 | 200 | 15.38 | 35 | 80 |
| 2 | PEI | — | 70 | VGCF | 20 | PPS | 30 | 12 | 60 | 5.00 | 15 | 83 |
| 3 | PSU | — | 90 | VGCF | 20 | PPS | 10 | 13 | 170 | 13.08 | 30 | 81 |
| 4 | PEI | — | 90 | VGCF | 20 | PEEK | 10 | 14 | 35 | 2.50 | 30 | 88 |
| 5 | PEI | — | 50 | VGCF | 20 | PPS | 50 | 11 | 35 | 3.18 | 10 | 85 |
| 6 | — | PPS | 100 | VGCF | 20 | — | — | 10 | 30 | 3.00 | 0 | Not calculable |
| 7 | PEI | — | 100 | VGCF | 20 | — | — | 15 | 1500 | 100.00 | 50 | 60 |

As indicated in Table 1, the physical property (the electrical characteristic and the physical characteristic) of the electrically conductive base and the battery characteristic (the cyclability characteristic) of the secondary battery each greatly varied depending on the composition of the electrically conductive base.

Specifically, in a case of using the electrically conductive base in which the holding body 10 included the first SEP and Accordingly, the electrically conductive base achieved compatibility between the electrical characteristic and the physical characteristic.

Further, the secondary battery using the electrically conductive base described above as the current collector 31A achieved a high capacity retention rate. Accordingly, the secondary battery achieved a superior cyclability characteristic.

Although the present technology has been described, the configuration of the technology is not limited thereto, and is therefore modifiable in a variety of ways.

For example, although the description has been given of the case of using a gel electrolyte (the electrolyte layer) and the case of using a liquid electrolyte (the electrolytic solution), the electrolyte is not particularly limited in kind, and an electrolyte in solid form (a solid electrolyte) may be used.

Further, although the description has been given of the case where the electrode reactant is lithium, the electrode reactant is not particularly limited. Specifically, as described above, the electrode reactant may be another alkali metal such as sodium or potassium, or may be an alkaline earth metal such as beryllium, magnesium, or calcium. In addition, the electrode reactant may be another light metal such as aluminum.

The effects described herein are mere examples, and effects of the present technology are therefore not limited to those described herein. Accordingly, the present technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electrically conductive base comprising:
   a holding body including a first super engineering plastic having non-crystallinity; and
   covering particles dispersed in the holding body, the covering particles each including a center part and a covering part, the center part including an electrically conductive material, the covering part covering a surface of the center part and including a second super engineering plastic having crystallinity.

2. The electrically conductive base according to claim 1, wherein
   the first super engineering plastic includes at least one of polyetherimide, polysulfone, polyphenylsulfone, or polyarylate, and
   the second super engineering plastic includes at least one of polyphenylenesulfide, polyetheretherketone, polyethersulfone, or polyamideimide.

3. The electrically conductive base according to claim 1, wherein the electrically conductive material includes a fibrous carbon material.

4. The electrically conductive base according to claim 1, wherein a ratio of a weight of the holding body to a sum total of the weight of the holding body and a weight of the covering part is greater than a ratio of the weight of the covering part to the sum total of the weight of the holding body and the weight of the covering part.

5. A secondary battery comprising the electrically conductive base according to claim 1 as a current collector.

6. The secondary battery according to claim 5, comprising a battery device in which the current collector and an electrode element are alternately stacked, wherein
   the electrode element includes:
     a positive electrode active material layer;
     a negative electrode active material layer;
     a separator disposed between the positive electrode active material layer and the negative electrode active material layer;
     a first electrolyte layer interposed between the positive electrode active material layer and the separator; and
     a second electrolyte layer interposed between the negative electrode active material layer and the separator.

* * * * *